N. B. Baldwin,
Drag Saw,

No. 49,692. Patented Sep. 5, 1865.

Witnesses
Theo Tuseh
Wm Trewin

Inventor.
N. B. Baldwin

UNITED STATES PATENT OFFICE.

N. B. BALDWIN, OF GEORGETOWN, ILLINOIS.

IMPROVEMENT IN SAWING-MACHINES.

Specification forming part of Letters Patent No. 49,692, dated September 5, 1865.

*To all whom it may concern:*

Be it known that I, N. B. BALDWIN, of Georgetown, in the county of Vermillion and State of Illinois, have invented a new and useful Improvement in Sawing-Machines; and I do hereby declare that the following is a full, clear, and exact description thereof, which will enable those skilled in the art to make and use the same, reference being had to the accompanying drawings, forming part of this specification, in which—

Figure 1:
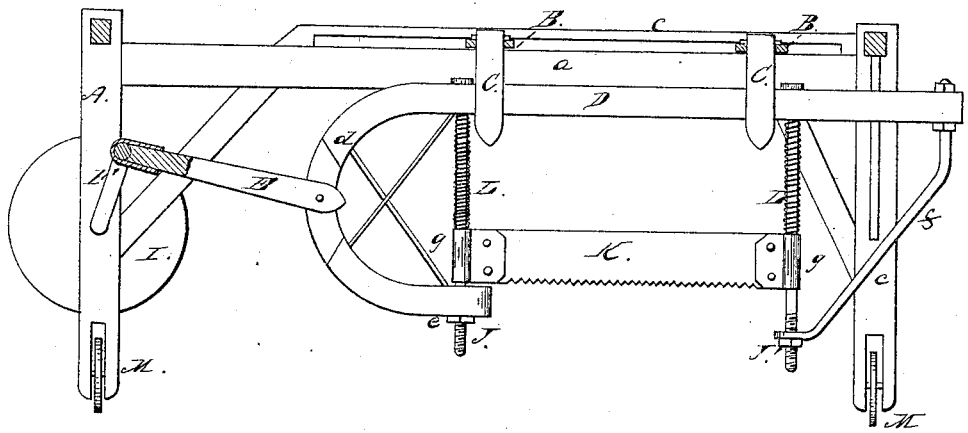
Figure 2:
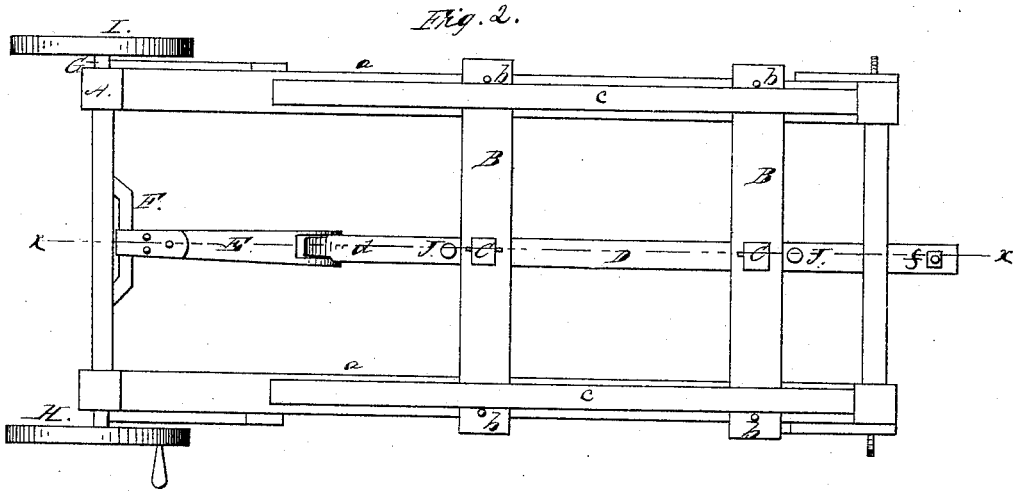

Figure 1 is a side sectional view of my invention, taken in the line *x x*, Fig. 2; Fig. 2, a plan or top view of the same.

Similar letters of reference indicate corresponding parts.

This invention relates to a new and improved sawing-machine for sawing wood transversely with the grain, and is designed for sawing logs into proper lengths for cord or fire wood, and also into lumber.

The invention consists in a novel construction and arrangement of the saw-frame, and in the application of springs to the saw for feeding the latter to its work.

A represents a rectangular framing, on the upper parallel side pieces, *a a*, of which two bars, B B, rest transversely and are allowed to slide freely back and forth thereon, said bars being retained in position by pins *b* passing through them near their ends and extending down at the outer sides of the side pieces, *a a*, and by bars *c c*, which extend over the tops of the bars A A longitudinally with the side pieces, *a a*.

Each bar B has a pendant, C, framed into it at its center, and to those pendants the saw-frame D is secured, the same consisting of a single bar bent in semicircular form at one end, as shown at *d*, said end *d* being connected by a pitman, E, to a crank, F, on a driving-shaft, G, having a crank-wheel, H, at one end and a fly-wheel, I, at the other end. The upper straight horizontal part of this saw-frame has two pendent rods, J J', attached to it, one of which, J, has its lower part extending through the lower bent part, *d*, of the saw-frame, and is held firmly by a nut, *e*, while the other rod, J', is braced by a rod, *f*, from the end of the upper part of the saw-frame, as shown in Fig. 1.

K is the saw, provided at each end with an eye or socket, *g*, through which the rods J J' pass loosely, said rods having a vertical position and being parallel with each other, and having upon them spiral springs L, which bear upon the eyes or sockets of the saw and have a tendency to press the same downward to its work.

The crank-shaft G may be turned by hand or other power, the log being placed under the saw transversely therewith, a reciprocating motion being given the saw-frame and saw through the medium of the crank and pitman.

The saw is kept to its work by the springs, and is thereby made to cut as fast at it is capable, while the saw-frame, in consequence of being constructed as described, is made to run steady and to cause the saw to work without springing or bending, thereby avoiding the kinking and breaking of saws.

The framing may be provided with wheels or casters M at its lower end for the convenience of transporting it from place to place.

The device may be cheaply constructed and kept in perfect running order by any one of ordinary ability.

I claim as new and desire to secure by Letters Patent—

The combination of the guide-rods J J' and springs L L with the saw K and frame D, as and for the purposes specified.

NATHANIEL B. BALDWIN.

Witnesses:
 THEODORE H. WEST,
 JOSEPH BAILEY.